United States Patent [19]
Arai et al.

[11] Patent Number: 5,404,478
[45] Date of Patent: Apr. 4, 1995

[54] METHOD OF MANAGING A VIRTUAL STORAGE FOR A MULTI-PROCESSOR SYSTEM

[75] Inventors: Toshiaki Arai, Sagamihara; Tomonori Miyashita; Yoshitaka Ohfusa, both of Yokohama; Hisashi Katada, Sagamihara, all of Japan

[73] Assignee: Hitachi, Ltd., Tokyo, Japan

[21] Appl. No.: 227,499

[22] Filed: Apr. 14, 1994

Related U.S. Application Data

[63] Continuation of Ser. No. 630,291, Dec. 19, 1990, abandoned.

[30] Foreign Application Priority Data

Dec. 28, 1989 [JP] Japan .................. 1-338170
Oct. 11, 1990 [JP] Japan .................. 2-270397

[51] Int. Cl.⁶ .............................. G06F 12/00
[52] U.S. Cl. .................. 395/400; 364/DIG. 1; 364/243; 364/256.3; 364/228.1; 364/228.2
[58] Field of Search .................. 395/400, 425

[56] References Cited

U.S. PATENT DOCUMENTS

| | | |
|---|---|---|
| 4,136,386 | 1/1979 | Annunziata et al. ............. 395/425 |
| 4,373,179 | 2/1983 | Katsumata ......................... 395/400 |
| 4,400,769 | 8/1983 | Kaneda et al. .................... 395/650 |
| 4,484,267 | 11/1984 | Fletcher ............................. 395/400 |
| 5,239,643 | 8/1993 | Blount et al. ..................... 395/425 |

FOREIGN PATENT DOCUMENTS 59-167761 9/1984 Japan .

*Primary Examiner*—Rebecca L. Rudolph
*Attorney, Agent, or Firm*—Fay, Sharpe, Beall, Fagan, Minnich & McKee

[57] ABSTRACT

A virtual storage management method in a multi-processor system in which individual processors share an external storage is shown. Data of the virtual storage is stored in the shared external storage, and a page table for managing the virtual storage of each processor is also stored in the shared external storage. By exclusively controlling an access to that page table, the virtual storage can be managed.

20 Claims, 13 Drawing Sheets

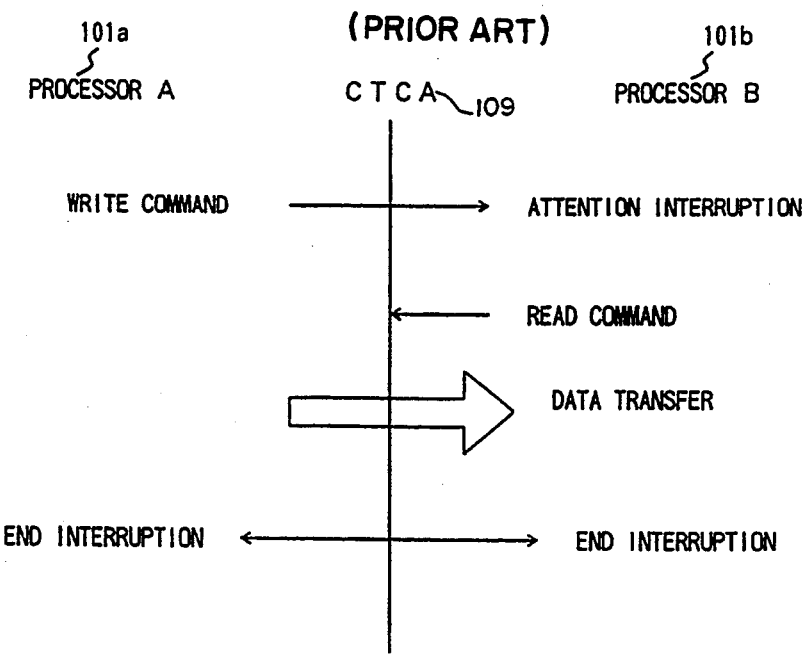
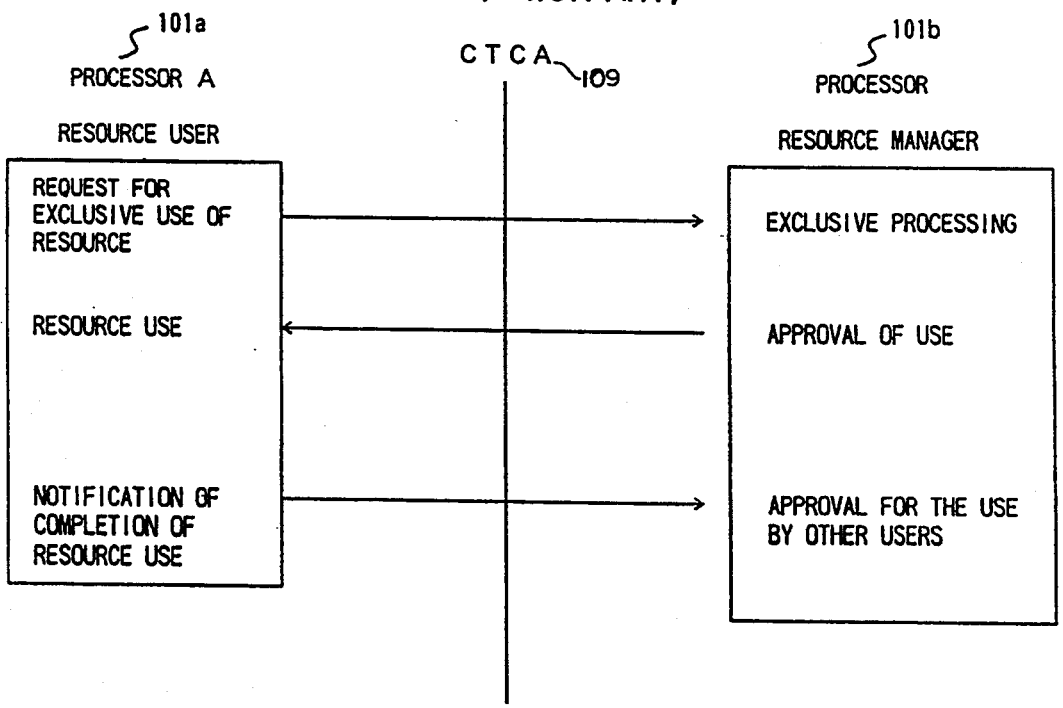

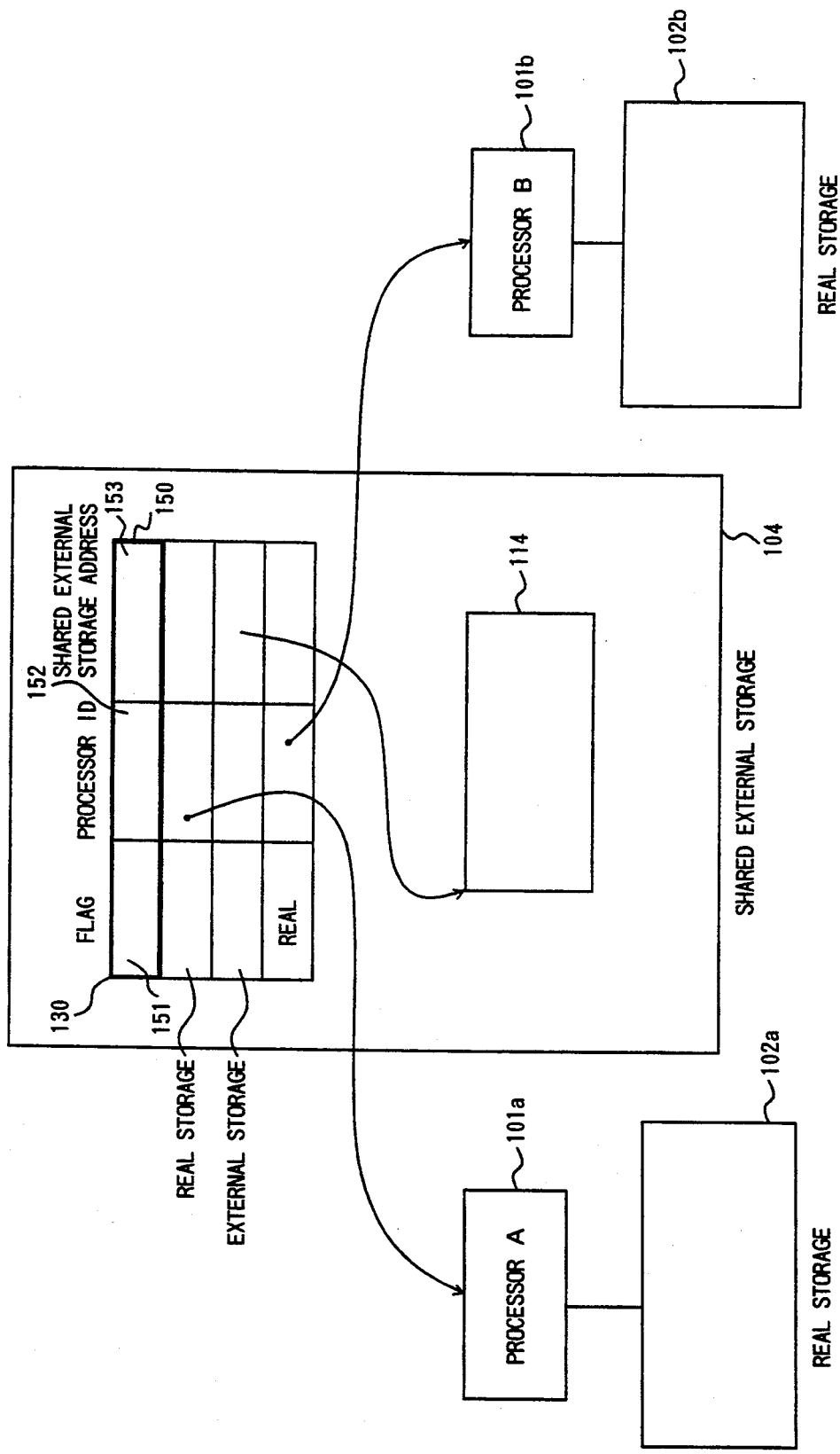

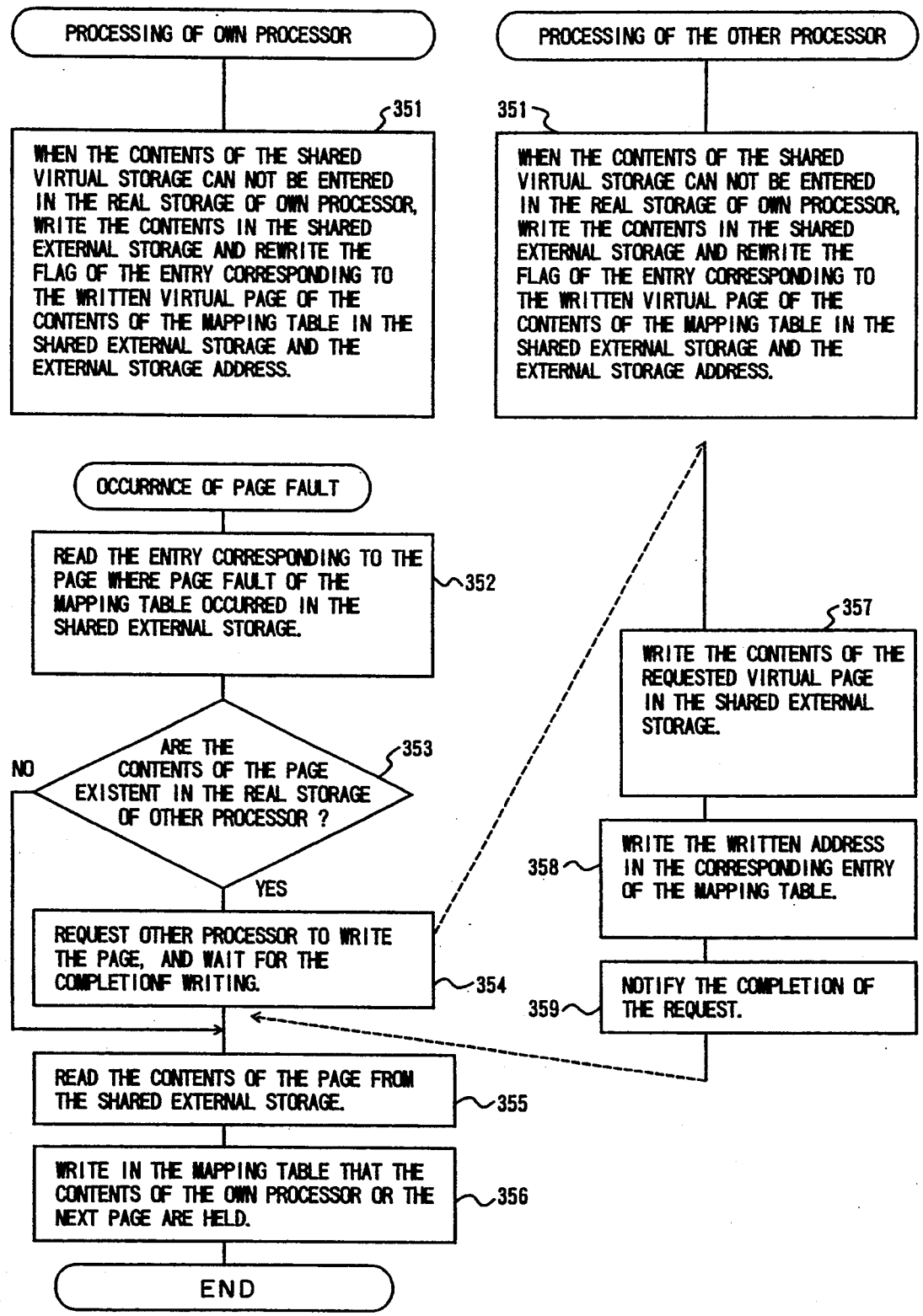

METHOD OF MANAGING A VIRTUAL STORAGE FOR A MULTI-PROCESSOR SYSTEM

This is a continuation of U.S. application Ser. No. 07/630,291, filed Dec. 19, 1990, now abandoned.

BACKGROUND OF THE INVENTION

The present invention relates to a multi-processor system which shares a storage other than a main (real) storage among processor in a large scale computer system, and more particularly to a virtual storage management method in a multiprocessor system equipped with a shared memory such as an extended storage of a large capacity to enable it to carry out a high-speed access.

A virtual storage system is a method of virtualizing a real storage by using an address translation table, and this method is a known art in the current large scale computer system. In this art, instructions and data are disposed on a virtual storage and a corresponding real address is obtained by an address translator which translates a virtual address, an address on the virtual storage, into a real address. An instruction is executed by using this real address. An operating system (OS) manages an address translation table used by the address translator to control the virtual storage.

FIG. 8 shows a system which realizes a virtual storage. A virtual storage 811 is a logical storage area which is referred to by a program. The virtual storage is managed by being divided into areas of a fixed length called pages. These pages are called virtual pages 812. The data of the contents of the virtual pages 812 is stored in a real storage 102 or in a paging data set 813 on a secondary storage 810. An address translation table 105 is a table which shows in which storage a data of a virtual page is being stored. Each of entries 814 of the address translation table 105 is prepared to correspond to each of the virtual pages and shows a position where data of each page is stored.

An invalid flag 205 of the page table entry 814 shows whether a real page is allocated to the corresponding virtual page or not. When the invalid flag 205 is off (valid), a real page 112 of the real storage 102 is allocated to the virtual page and the address of the real page is stored in a real page address entry 206.

On the other hand, when the invalid flag 205 is on (invalid), no real page is allocated. In this case, the contents of the corresponding virtual page are stored in a page data set 813, and an external page address entry 207 holds the address of an external page 114 of the contents.

When an access is made to a virtual page of which address translation table entry 814 is valid (that is, an invalid flag is off), an address translation mechanism of the hardware translates the virtual page address into a real page address and makes access to its contents. When an attempt is made to make reference to a virtual page of which address translation table entry 814 is invalid (that is, an invalid flag is on), an address translation operation is not completed and an interruption occurs. This is called an address translation exception interruption or a page fault interruption. When this interruption occurs, the operating system (OS) allocates a real page that can be utilized, writes the contents of the corresponding virtual page stored in the external page table entry 207 into the allocated real page, and turn the invalid flag 205 off. After the above processings are performed, it becomes possible to make access to the corresponding virtual page.

In the actual computers, a two-stage translation by using a segment table and a page table is often carried out to save the address translation table. However, their basic structures and control methods are the same as described above.

The above translation system is a known art in the field of a large scale computer system, and the details of the art are described, for example, in "Reality of the Operating System" by Yasufumi Yoshizawa, Chapter 3 "Virtual Memory System", pp. 85–124, published by Kabushiki Kaisha Shokodo, ISBN 4-7856-3503-7.

A loosely coupled multi-processor system (LCMP) which is one of the multi-processor systems shares an external storage (DISC, etc.) other than a main storage among the processors and communicates with the processor through a channel-to-channel adapter (CTCA) connected among the processors. In the LCMP system, each of the processors operates as an independent system. Therefore, even if there occurs an error in one of the processor systems, it does not affect the operations of the rest of the processors. Further, a normal processor can take over the continuous processing of the system in which an error occurred, so that a highly reliable computer system can be provided. The LCMP system having the above features is being widely employed in systems such as banking systems of which reliability is highly required. The LCMP system is a known art in the field of the computer system, and the details of the system are described, for example, in the "Iwanami Information Science Dictionary", ISBN4-00-080074-4, pp. 438, multi-processor.

FIG. 9 shows an outline of the LCMP system. In the LCMP, a plurality of processors share a storage area (an external storage) other than a main storage. In FIG. 9, a shared external storage 104 is shared by two processors, i.e. a processor A 101a and a processor B 101b. In order to have communication between the processors, the processors are connected through a channel 109 called a CTCA and communication is performed by mutually taking an image of input and output operations, that is, by regarding the other processor as an I/O unit connected to the own processor. Further, each processor has its own real storage, 102a and 102b respectively.

In order to share an external memory in the LCMP, it is necessary to carry out an exclusive control between the processors. There are two methods for the above. In one method, (1) a mechanism equipped in an external storage is used and this cannot be accessed from the other processor while one processor is using that. In the other method, (2) a software on one processor performs resource management, and when a shared resource (an external storage) is to be accessed a request is made to this software so that the shared resource is exclusively controlled. Description will be made here of the outline of the method for carrying out an exclusive access of a shared resource when each processor communicates by using the CTCA.

FIG. 10 shows the outline of the communication system using the CTCA. The CTCA appears to be an I/O unit for each processor. In this example, data is transferred from a processor A 101a to a processor B 101b. The processor A 101a first issues a write command to the CTCA. As a result, an attention interruption is applied to the processor B 101b. In correspondence with this interruption, the processor B 101b issues a read command. Thus, requests from both processors are corresponded, and data transfer is started. After a data transfer is completed, the CTCA applies an end interruption to both processors.

FIG. 11 shows the outline of the method of carrying out an exclusive control of the resource by using the above-described data transfer method. It is assumed that a resource user is disposed in the processor A 101a and a resource manager is disposed in the processor B 101b. The resource user issues a request for an exclusive use of the resource to the resource manager. This request is noticed to the manager in the processor B 101b through the CTCA. When there is no user using the resource at that time, the manager approves the user who issued the request for the use of the resource. The user who received the approval uses the resource, and issues a notification of completion after he (she) finished using the resource. The manager who received the notification of completion delivers a right of usage to other user who issued a request for using the resource.

In the above process, exclusive control of the shared resource is carried out in the LCMP.

The processing system in the LCMP is described in detail, for example, in the "Multi-virtual Storage Operating System" by Hajime Kamata, Chapter 6.3, Ohm Sha, ISBN 4-274-07170-7. Also, the hardware specification of the CTCA is described in detail in the HITAC manual, "Channel-to-channel Adapter (CTCA)", 8080-2-072.

As a drawback of the LCMP system, there is a problem that the communication between the processors is relatively slow. A tightly coupled multi-processor (TCMP) which is another method of a multi-processor system shares a real storage and a virtual storage so that its communication speed is very high (several hundred MB/sec., or faster). In contrast to the TCMP, the LCMP performs communication through a channel and a disk, so that its communication speed is at most around 1 MB/sec.

Because of the above drawback, there is a problem that the features of the LCMP cannot be sufficiently exhibited. For example, when a system resource such as a shared disk is used, an exclusive control is necessary between the processors, and an inter-processor communication becomes essential for that purpose. When an error occurred in one of the processors and the other processor is to take over the processing, it is necessary that the data used by the former processor is transferred to the other processor. In this case, the data is transferred through the channel or the CTCA in the conventional LCMP system, so that the speed is slow and the performance of the LCMP system cannot be sufficiently exhibited.

On the other hand, in the large scale computer system, there occurs a problem that an I/O operation to the disk unit becomes a bottleneck to inhibit its performance. In order to solve this problem, data of the disk is stored in the main storage in advance, and when there is a request for data input and output to and from the disk, it is not necessary to have an I/O operation to the disk when data exist in the main storage, and data transfer within only the main storage is carried out to replace the I/O operation, thereby to apparently increase the speed of the I/O operation. This system is called a virtualization of an input and an output, and is a well known art in a large scale computer.

The virtualization system of an input and an output is a system for avoiding an actual I/O operation by using the main storage as a cache. A problem in this case is that in the LCMP system, the virtualization technique of an input and an output cannot be applied to the data shared between the processors. This is because, in the LCMP, each processor is equipped with an independent main storage so that data between main storages used as cache cannot be reconciled.

For the above reason, when data is to be shared in the LCMP system, the data to be shared is arranged in a shared disk or the like and the data is communicated between the processors by using the CTCA to carry out an exclusive control thereby to make access to the shared disk.

An extended storage (ES) was developed recently as a storage for a computer system (Japanese Patent Unexamined Publication No. 59-167761). This is a storage which can carry out data transfer to and from the main storage in page unit and which can make access at a higher speed than the conventional external storage like a disk. However, in order to use the ES, it is necessary to use an exclusive access instruction to prepare a program. Therefore, a user's program cannot take advantage of the high-speed ES as it is.

SUMMARY OF THE INVENTION

It is an object of the present invention to provide a virtual storage management method which enables the LCMP system to simply carry out data sharing and exlusion at a high speed by realizing a shared virtual storage in the LCMP system.

It is another object of the present invention to provide a virtual storage management method which makes it possible to virtualize an input and an output to and from a shared storage in the LCMP system.

It is still another object of the present invention to provide a virtual storage management method which exhibits a high-speed effect of an extended storage (ES), an electronic storage, when it is shared among the processors, without making the user to be conscious of the ES, that is, without a need for preparing a program to make access to the shared ES.

The above objects have been set based on the recognition of the following problems in the prior art.

The methods including the virtual storage method, the LCMP multi-processor system and the virtualization of an input and an output are techniques which are inevitable in the current large scale computer system. However, as described above, there are many inconveniences when these techniques are to be used by combining together. In other words, there are following disadvantages.

(1) In the LCMP, the communication means among the processors are complex and there is much.

(2) In the LCMP, a high-speed main (real) storage cannot be shared. Accordingly, a virtual storage which is structured by a real storage and a secondary storage cannot be shared either. The virtual storage can be referred to by an instruction, so that it is a storage which can be accessed most easily. Therefore, when the virtual storage cannot be shared among the processors, communication among the processors becomes very complex.

(3) In the LCMP, the virtualization method for an input and an output cannot be used.

(4) In order to use a high-speed extended storage (ES), an exclusive access method must be programed, and there is no method for using the ES simply and effectively.

The above points are the problems of the prior art.

In order to achieve the above objects, the methods of the present invention are structured as follows.

(1) As a basic idea, in the multi-processor system (LCMP), pages which have been taken out from the main storage are written into a shared external storage. When one of the multi-processors needs the pages that have been taken out, these pages are read from the shared external storage so that the processor which needs the pages can make access to the pages that have been taken out. Further, contents of a mapping table which shows what pages of the virtual storage of each processor are written to where in the shared external storage, are also written in the shared external storage. When a page fault occurs in any one of the processors, mapping tables of other written processors are read to know the position of the page to be read from the shared external storage so that this page can be read from each processor.

(2) More specifically, the method of the present invention comprises the following steps:

(a) a step in which contents of a mapping table for managing the virtual storage of each of the processors are written on the shared external storage, (b) a step in which the mapping tables of other processors written are read from the shared external storage to check the usage state of necessary pages, when it is necessary for an optional processor to make access to these pages which are not held by that processor, (c) when one of the above-described other processors is using the above necessary pages,
  (i) a step in which a request is made to the above other processor to write the above necessary pages in the shared external storage and a completion of the writing by the above other processors is awaited,
  (ii) a step in which the above other processor that has been requested to write, writes the necessary pages in the shared external storage and then notifies the processor which made the write request that the writing has been completed,
  (iii) a step in which the processor that made the write request and has received notification of completion of the writing reads the necessary pages that have been written, from the shared external storage, and (d) a step in which the above necessary pages are read from the shared external storage when the above other processors are not using the above necessary pages, and an access is made to these pages.

As a detailed structure, a shared page data set (PGDS) is disposed on the shared external storage and the contents of the virtual storage are stored in the shared PGDS so that each one of the processors of the LCMP can make access to the virtual storage. By this arrangement, even if a page fault occurs, it is possible to read the contents of the virtual storage on the shared PGDS to make access to the page. The contents of the address translation table are further stored in the shared PGDS in addition to the contents of the virtual storage, and the usage state of the shared virtual storage of the other processors is checked by using the stored contents. Thus, a method of allocating the real storage to the virtual storage of the own processor can be determined.

In the system of the LCMP structure, when a page is to be taken out from the main storage, the contents of the page are written in the shared external storage. Therefore, it is possible to read this page from any one of the loosely coupled multi-processors into the main storage of the own processor, so that a shared virtual storage can be realized between the processors. Further, the contents of the mapping table of each processor are similarly stored in the shared external storage. Therefore, by reading the contents it is possible to know which processor is storing what page in the main storage or in what portion of the shared externals storage a page is being stored. Thus, it has become possible to decide a method of allocating the main storage in the shared storage. As a result, it is possible to realize a shared virtual storage having the same contents between the processors.

In the system of the LCMP structure, when a page is to be taken out from the main storage, the contents of the page are written in the shared external storage. Therefore, it is possible to read this page from any one of the loosely coupled multi-processors into the main storage of the own processor, so that a shared virtual storage can be realized between the processors. Further, the contents of the mapping table of the processor for the shared virtual storage are similarly stored in the shared external storage. Therefore, by reading the contents it is possible to know which processor is storing what page in the main storage or in what portion of the shared external storage a page is being stored. Thus, it has become possible to decide a method of allocating the main storage in the shared storage. As a result, it is possible to realize a shared virtual storage having the same contents between the processors.

In the system of the LCMP structure, a page data set is disposed in the shared storage and the contents of the virtual storage are stored in the shared page data set, so that it is possible to realize a shared virtual storage in which every processor can make access to a page of the page data set not existing in the main storage. Further, the contents of the address translation table are similarly stored in the shared page data set. Therefore, if any one of the processors made an access to the shared virtual storage and generated a page fault, the contents of the address translation table of the other processor are read from the shared LCMP and the allocation method of the real storage of the own processor to the shared virtual storage can be decided after checking the usage stage of the shared virtual storage by the other processor. Thus, it is possible to easily realize a shared virtual storage having the same contents between the processors which enables any one of the processors to make access to a page on the page data set not existent in the main storage.

The address translation table of each processor is disposed in the shared page data set which is accessible from all the processors, so that each processor can discriminate whether the other processors are using the shared virtual storage or not. If the other processor has already allocated its real storage to the shared virtual page and is using this page to which one processor is going to make access, this processor makes a request to the using processor to write back the corresponding shared virtual page and release the corresponding real storage. By this operation, two or more processors do not allocate a real storage to the same virtual page of the shared virtual storage, and it becomes possible to prevent an occurrence of a contradiction in the contents of the same virtual page between the processors (FIG. 3).

In order to refer to the shared virtual storage, a private virtual storage is used as a window. The corresponding entry of the address translation table of the shared virtual storage stored in the shared storage is copied in the corresponding entry of the private storage. Thus, it becomes possible to refer to the shared storage from the window. Further, when the use of the shared virtual storage has been completed, the corresponding entry of the address translation table of the virtual storage is copied to the corresponding entry of the address translation table of the shared virtual storage. Thereafter, the other processors can similarly use the windows to use the shared storage (FIG. 4 and FIG. 5).

In order to exclusively carry out window mapping between the processors, a flag which shows that mapping is being carried out is provided. When there is a request for mapping, the mapping flag is inspected. If mapping has already been done, the execution of the mapping request is kept waited until the mapping is released. Thus, an exclusive control becomes possible.

The contents of the file on the shared storage are stored in the shared virtual storage, so that virtualization can also be applied in making access to the shared file.

All the contents of the file on the shared storage are stored in the shared virtual storage, so that making access to the file can be replaced by making reference by using a machine language.

A shared PGDS is disposed in the extended storage which is shared between the processors, so that it is possible to make a quick access even if the contents of the shared virtual storage have been written in the shared PGDS.

BRIEF DESCRIPTION OF THE DRAWINGS

The objects and features of the invention will best be understood from a detailed description of a preferred embodiment thereof, selected for purposes of illustration and shown in the accompanying drawings, in which:

FIG. 10 is an explanatory diagram for the inter-processor communication system according to the channel-to-channel adapter (CTCA);

FIG. 11 is an explanatory diagram for the resource exclusive method in the LCMP system using the channel-to-channel adapter (CTCA);

FIG. 13 is a configuration diagram showing the details of the embodiment of the mapping table which constitutes the shared virtual storage; and FIG. 14 is a flowchart showing the procedure for realizing the shared virtual storage.

DESCRIPTION OF THE PREFERRED EMBODIMENTS

Description will now be made of the preferred embodiment of the present invention with reference to the drawings.

Figure 1:
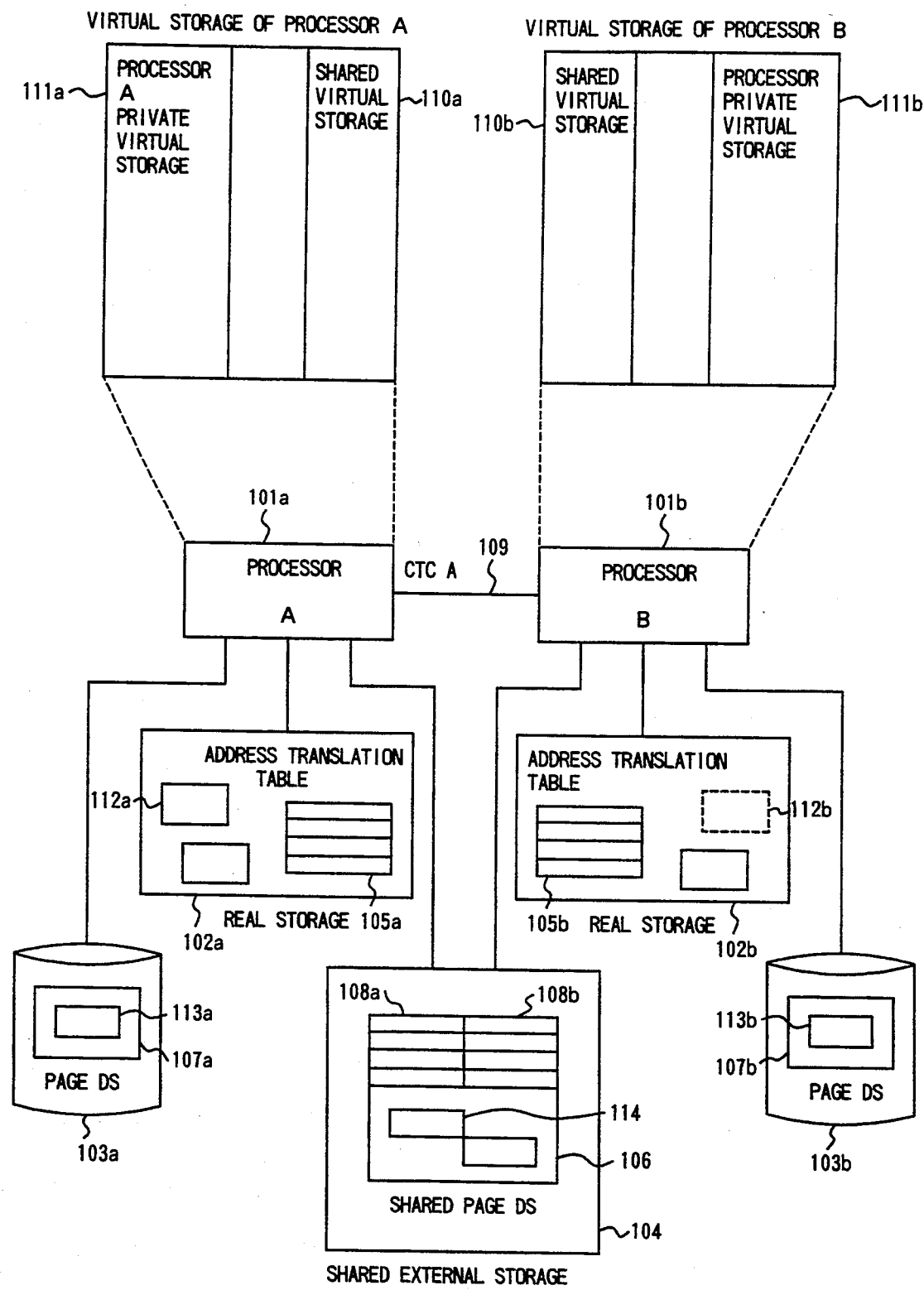
FIG. 1 is a block diagram showing the functional structure of the multi-processor system that constitutes the shared virtual storage according to the method of the present invention.

FIG. 1 shows an embodiment of the table structure for realizing the shared virtual storage. The present invention is characterized in that the page data set is disposed in the shared external storage and that the contents of the address translation table for managing the virtual storage are stored in this shared page data set. By the above processing, it is possible to structure a virtual storage (shared virtual storage) having the same contents among a plurality of processors. Details of the embodiment will be explained below in accordance with FIG. 1.

FIG. 1 shows an LCMP system which is structured by two processors, a processor A 101a and a processor B 101b. The present invention does not depend on the number of processors and can be similarly applied to other cases where the number of processors is increased. In the present explanation, those items which are own to the processor A are displayed by adding "a" at the end of their numbers and those items which are own to the processor B are displayed by adding "b" at the end of their numbers. Those items which are displayed with only numbers are shared between the processors or are used generally.

A processor A 101a and a processor B 101b are connected to their own real (main) storages 102a and 102b and to their own external storages 103a and 103b respectively. Further, these two processors share an external storage 104 which is a shared storage between the processors, and they are connected by a channel-to-channel adapter (CTCA 109) so that these processors can communicate with each other.

Figure 8:
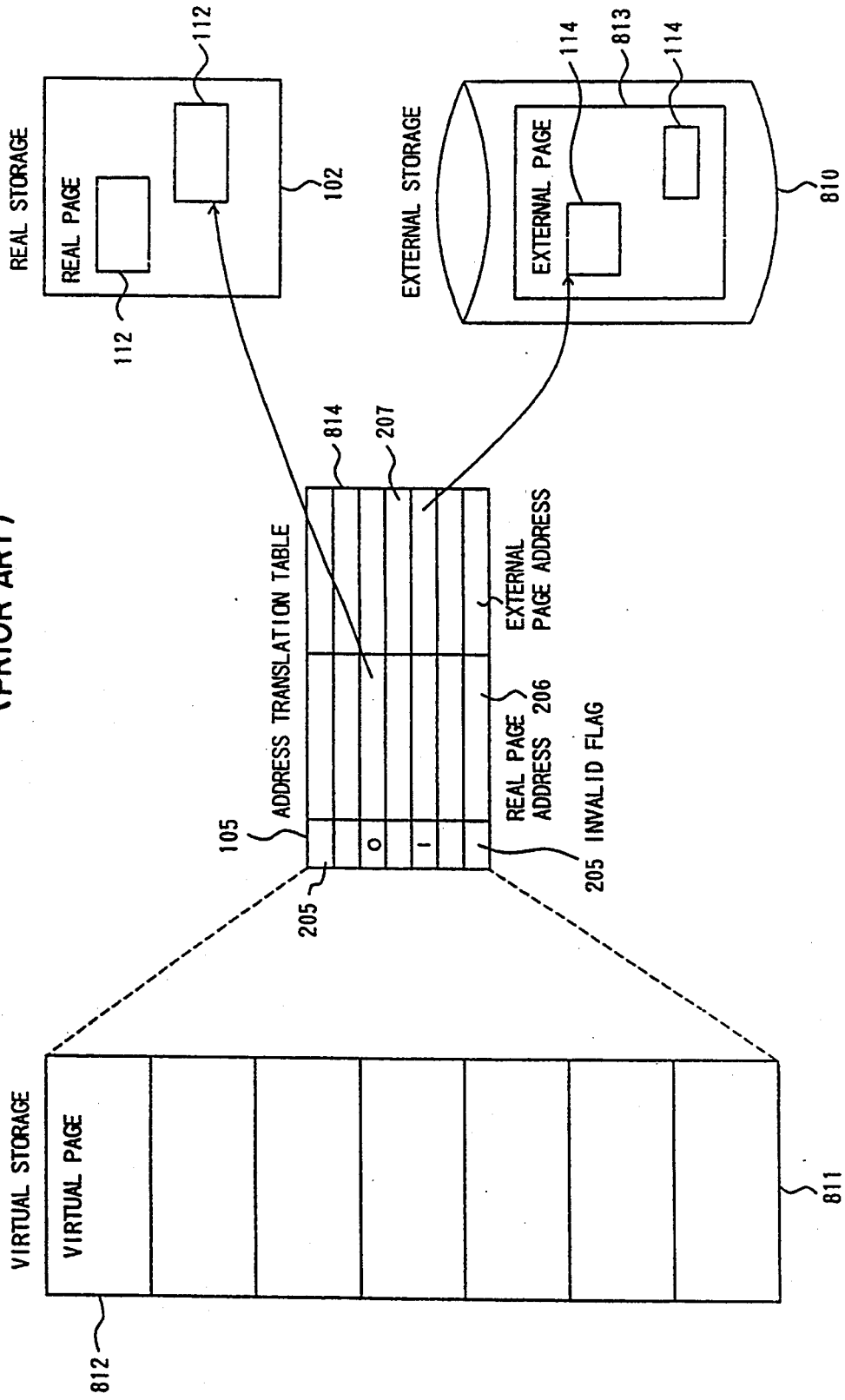
FIG. 8 is an explanatory diagram for explaining the conventional method of realizing the virtual storage.

Address translation tables 105a and 105b manage virtual storages of their respective processors, and they are stored in the real storages 102a and 102b of their respective processors and are used by the address translation mechanism in the processors 101a and 101b. Respective entries of the address translation tables 105a and 105b show whether the contents corresponding to the virtual pages are valid and whether they exist in the main storages 102a and 102b of the respective processors or the contents corresponding to the virtual pages are invalid and they exist in page data sets 107a and 107b respectively. This method is as explained in FIG. 8.

A shared virtual storage 110a for the processor A and a shared virtual storage 110b for the processor B which are the characteristics of the present invention hold the same contents together. For this purpose, a shared page data set (a shared PGDS) which is a page data set for the shared virtual storage is disposed in the shared external storage 104. Further, the contents of the pages of the shared virtual storages 110a and 110b and the contents of the address translation tables 105a and 105b of the respective processors are copied from the respective real storages 102a and 102b and are stored in areas 108a and 108b respectively in the shared PGDS 106.

The page data sets 107a and 107b are disposed in the external storages 103a and 103b which are connected to their respective processors in order to realize virtual storages 111a and 111b which are individualized to the respective processors. When the virtual storage is a shared virtual storage, the shared page data set 106 is used as a page data set, and when virtual storages own to the respective processors are to be generated, the private page data sets 107a and 107b are used. In other words, the entry for the virtual storage 111a own to the processor in the address translation table points to the real page 112a or the external page 113a, and the entry for the shared virtual storage 110a points to the real page 112a or the shared external page 114.

In the present invention, the contents of the virtual storage mean the contents of the real page 112a and the shared external page 114. Particularly, the contents of the virtual storage stored in the shared PGDS mean the contents of the shared external page 114.

Figure 2:
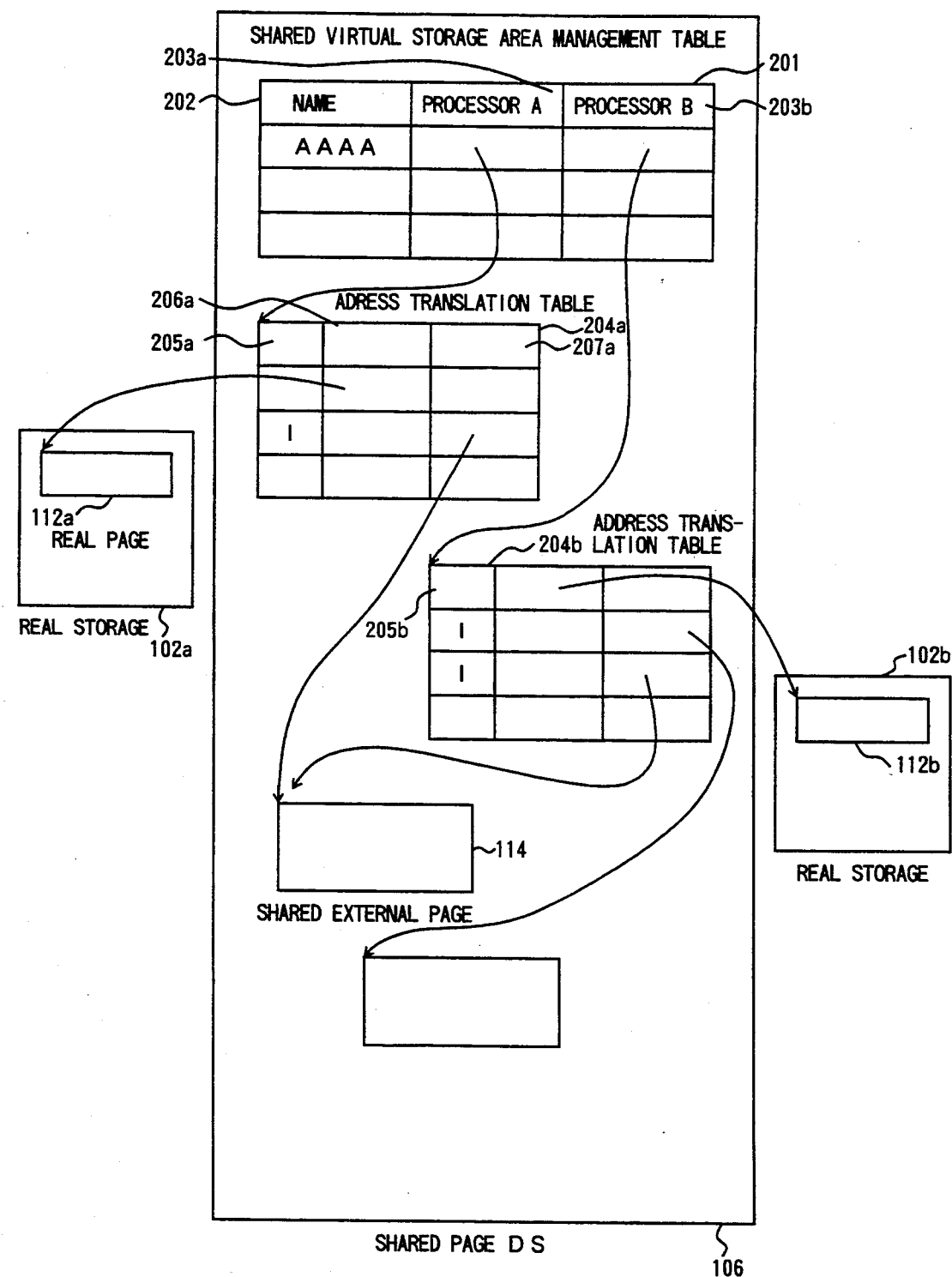
FIG. 2 is a configuration diagram showing the details of the embodiment of the shared page data set that constitutes the shared virtual storage.

FIG. 2 shows the details of the shared PGDS 106 in the shared external storage 104. The portion including tables 201, 204a and 204b corresponds to areas 108a and 108b in FIG. 1. Many virtual storage areas can be defined. The shared virtual storage area management table 201 comprises a name entry 202 of the shared virtual storage area and address translation entries 203a and 203b for the respective processors. The address translation entries 203a and 203b show the addresses within the shared PGDS which store the contents of the address translation tables which the respective processors use to refer to the shared virtual storage area.

Contents 204a and 204b of the address translation tables show the usage states of the shared virtual storage by the corresponding processors. Description will hereinafter be made of only the portions relating to the processor A. However, the same description also applies to the portions relating to the processor B. The contents 204a of the address translation table for the processor A comprises the entries of an invalid flag 205a, a real page address 206a and an external page address 207a. The meaning of the respective entries are as explained in FIG. 8. When a real page is allocated to a corresponding virtual page, the invalid flag 205a is off and the real page address 206a shows the address of the real page 112a of the own processor (processor A) in the real storage 102a. When the invalid flag 205a is on ("1"), a real page is not allocated to the corresponding virtual page and the contents of the virtual page are stored in the shared external page 114 shown by the external page address 207a.

By referring to the shared virtual storage management table 201 having the above configuration and the contents 203 of the address translation table, each processor can discriminate whether the other processor is using the shared virtual storage or not or whether the other processor has allocated its real storage or not. Based on the result of the respective discriminations, a control is provided so that no contradiction arises in the contents of the shared virtual storage. Processing necessary for the above purpose will be explained below.

A method for managing the shared virtual storage by using the data structures shown in FIGS. 1 and 2 will be explained with reference to the flowchart in FIG. 3.

In the present invention, so long as an external storage is shared between the processors as a shared external storage, the types of external storage does not matter. For the sake of convenience of explanation, it is assumed here that an extended storage (ES) is used as a shared external storage. It is a feature of the ES that it is possible to transfer data by using a synchronously executed instruction (a synchronous instruction) by the completion of the execution of which the processor cannot execute other instruction. Therefore, the use of the ES has an advantage that an interruption is not necessary thus simplifying the processing, as compared with the case where a storage is used as a shared external storage based on which the processor simply requests starting of an instruction and uses other instruction (asynchronous instruction) that can be executed until the execution of the first instruction has been completed thus performing a data transfer, like the I/O instruction used in the conventional disk unit. The outline of the hardware specification of the ES to be used is as follows.

(a) It is possible to carry out data transfer between the ES and the virtual storage (actually between the ES as a shared external storage and a real storage) by using a synchronous instruction by a processor.

(b) An instruction is prepared which can make an exclusive access to an area designated by the ES.

(c) The ES can be shared between the processors.

Description will be had by using the ES having the above characteristics, but the present invention can be equally applied to the case where a storage using an asynchronous instruction is used as a shared external storage. This is because a means for waiting for the completion of a data transfer and an interruption are necessary for each of the data transfer processings expressed in the explanation. A means for waiting for the completion of a data transfer and an interruption processing are known arts and therefore, they are not explained here.

Figure 3:
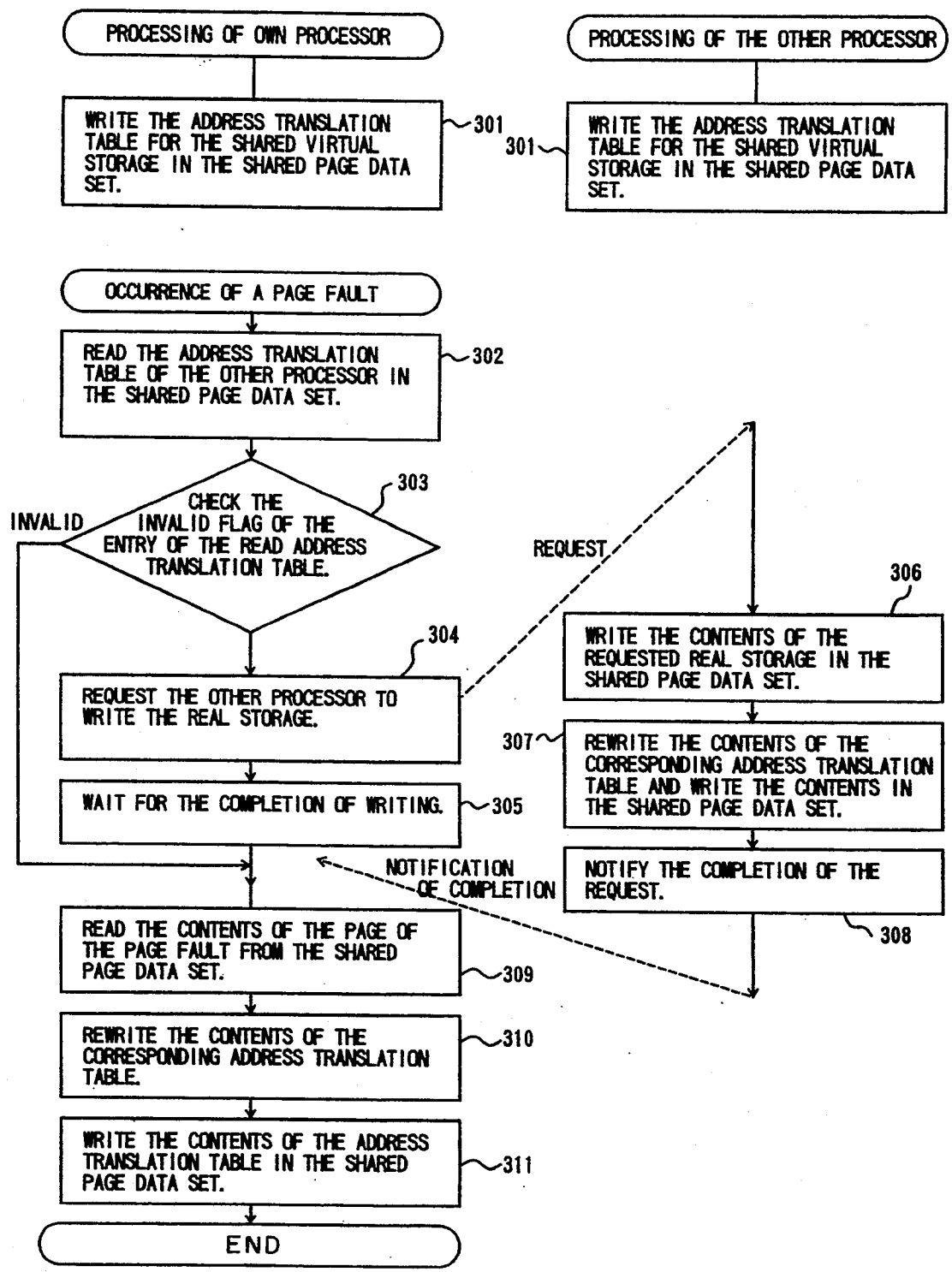
FIG. 3 is a flowchart showing the procedure for realizing the shared virtual storage.

The key point in FIG. 3 is to make the contents of the shared virtual storage consistent between the processors.

For this purpose, the address translation table 105 for the shared virtual storage area is copied in the shared PGDS 106 (Step 301). Each time when the address translation table for accessing the shared virtual storage 110 is updated, the updated contents are copied in the shared PGDS 106. (The contents of the table 204 are made consistent with the contents of the table 105a, and the contents of the table 204b are made consistent with the contents of the table 105b.) The position of the copying destination is designated in the shared virtual storage management table 201 within the shared PGDS 106.

When the user program has referred to the shared virtual storage area 110, an address translation is executed in the hardware by using the address translation table 105 in the real storage. In this case, when the invalid flag 205 of the corresponding entry of the address translation table is on (invalid), a program check interruption occurs. When this interruption occurs, the operating system carries out a paging processing. First, the operating system reads the contents 204 of the address translation table of the other processor within the shared PGDS 106 in order to discriminate whether the processor other than the own processor is using the corresponding virtual storage area or not (Step 302). For example, when a page fault interruption (the explanation is proceeded based on this assumption) has occurred in the processor A, the operating system reads the contents 204b of the address translation table for the processor B. In this case, the address translation table is locked to carry out an exclusive control in order to avoid such a situation that other processor rewrites the contents of the address translation table while a discrimination is being made. There are various methods of exclusive control as described in the explanation of the LCMP system. The explanation in this case does not depend on the above-described methods.

Figure 9:
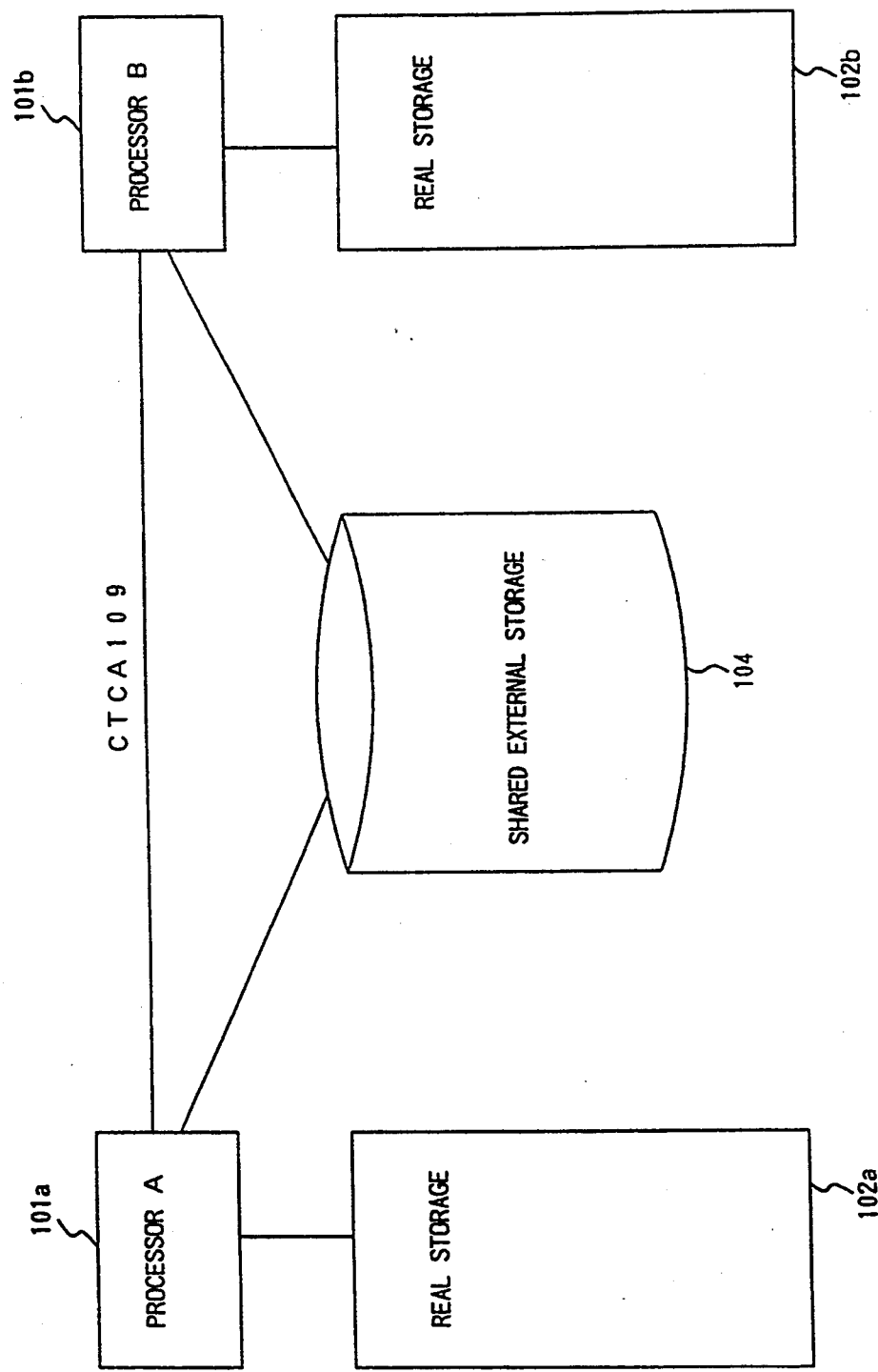
FIG. 9 is an explanatory diagram for explaining the conventional loosely coupled multi-processor system (LCMP)

Next, the invalid flag 205b of the corresponding entry of the contents 204b of the read address translation table is checked (Step 303). When the invalid flag 205b is off (valid), the processor owning the address translation table (in this case, the processor B) has allocated the real storage (for example 112b) to the corresponding shared virtual page. Then, a request is made to the processor B 101b which has allocated the real storage to write back the contents of the corresponding real storage in the shared PGSD 106 (Step 304). The request is made by using the communication means of the LCMP such as the CTCA as previously explained in FIG. 9. Thereafter, the completion of the request is awaited (Step 305).

The processor which received the write back request (the processsor B) writes (copies) the contents of the designated real page 112b in the shared PGDS 106 (Step 306). After completion of the writing, the corresponding real page 112b which is not required any more is released, the corresponding entry of the address translation table 105b is rewritten, and the contents rewritten are written in the shared PGDS 106 (Step 307). Thereafter, the completion of the writing is advised to the processor which issued the write request (the processor A) (Step 308).

The processor (the processor A) which has received the notification of completion of writing reads the contents of the corresponding shared virtual page (corresponding to the contents of the real page 112b written in step 306) from the shared PGDS 106 (Step 309). Then, the address translation table 105a is rewritten so that the address translation mechanism operates (Step 310). Thereafter, the rewritten address translation table is written in the address translation table management table 201 within the shared PGDS (Step 311).

By the above operation, data can be transferred, through the shared PGDS, to the area which has been used by the other processor and updated so that the contents of the shared virtual storage can be kept consistent between the processors.

Figure 12:
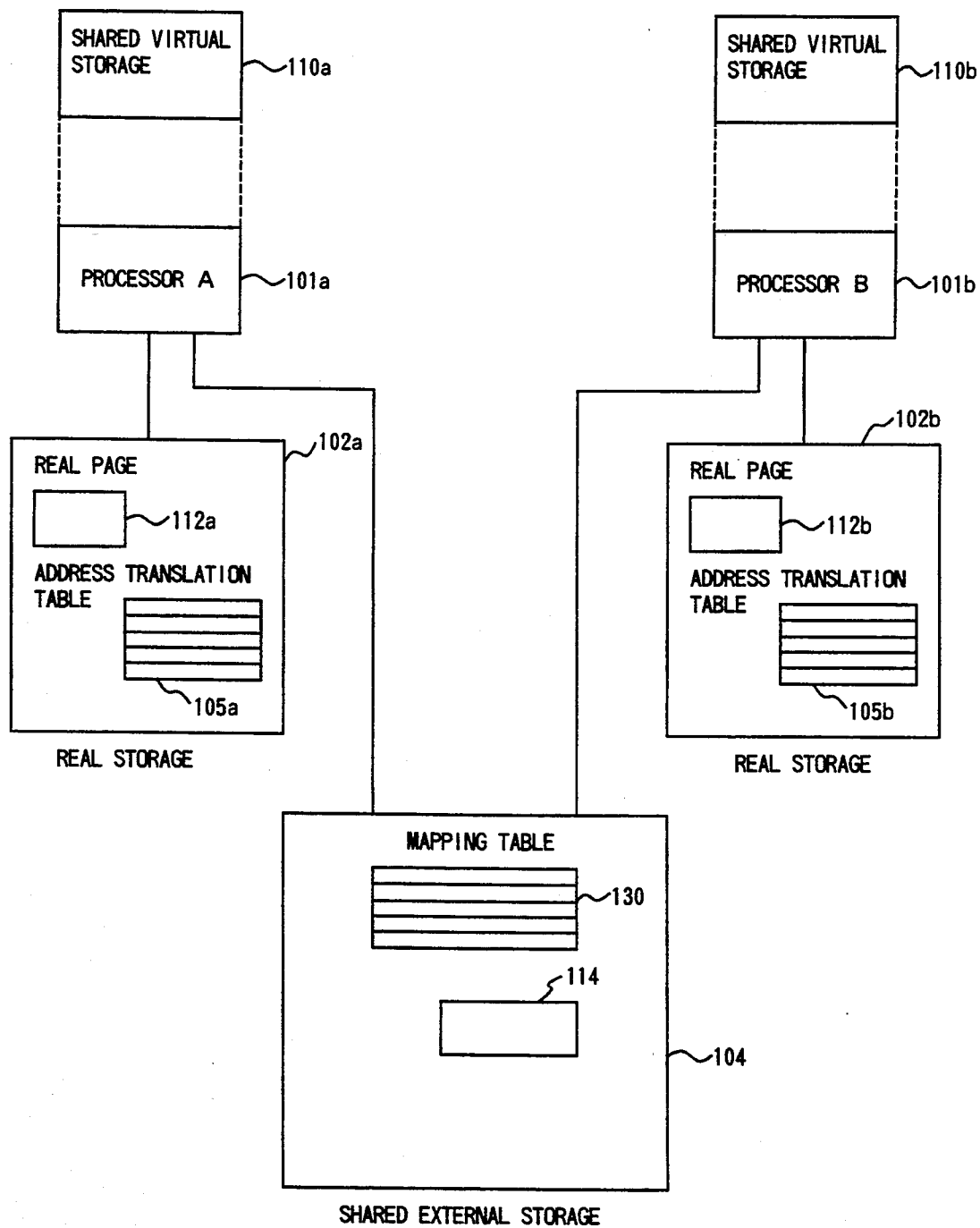
FIG. 12 is a block diagram showing the functional structure of the multi-processor system for constituting the shared virtual storage according to the method of the present invention.

FIG. 12 shows another embodiment illustrating a table structure for realizing a shared virtual storage.

The present invention is characterized in that a shared virtual storage mapping table 130 which shows where each of the pages of the shared virtual storage is allocated is disposed in the shared external storage. The detailed structure of the shared virtual storage mapping table 130 will be explained later with reference to FIG. 13.

In FIG. 12, a processor A 101a and a processor B 101b constitute an LCMP, and have own real storages 102a and 102b respectively and share or shared external storage 104. Address translation tables 105a and 105b of shared virtual storages 110a and 110b are disposed on the real storages 102a and 102b of the respective processors 101a and 101b. In the shared external storage 104, a mapping table 130 is stored which shows page groups that have been taken out from the real storages 102a and 102b in the contents of the shared virtual storages, and where in which one of the real storages 102a and 102b each page of the shared virtual storage is stored or where in the removed pages each page of the shared virtual storage is stored.

With the above-described configuration, it is possible to know where the contents of any one of the pages of the shared virtual storages 110a and 110b are stored, by retrieving the mapping table 130. Therefore, when a processor tried to refer to a certain page of the shared virtual storage and when the contents are not existing the real storage of the corresponding processor, it is possible to read the mapping table 130 in the shared virtual storage to check the storage position and read the contents, thereby to solve the problem of non-existence of the contents in the real storage.

FIG. 13 shows the details of the structure of the mapping table 130 in FIG. 12.

The mapping table 130 comprises a plurality of entries 150, and each entry corresponds to the virtual page of the shared virtual storage. The entry 150 comprises a flag 151 which shows whether the contents of the virtual page exist in the real storage or in the shared external storage, a processor identifier 152 to which a real storage is connected when the contents of the virtual page exist in this real storage, and a shared external storage address 153 which shows a position of the contents of the virtual page in the shared external storage when the contents of the virtual page are disposed in the shared external storage.

When a corresponding page of the shared virtual storage is allocated to the real storage of a processor, for example, when the contents are stored in the real storage 102 of the processor A 101a, the flag 151 indicates that the corresponding virtual page exists in the real storage and the processor identifier 152 points to the processor A 101a. When the contents of the corresponding page are stored in the shared external storage, the flag 151 indicates that the virtual page exists in the shared external storage and the shared external storage address 153 shows the address of the shared external storage page 114 in which the contents of the corresponding page are stored. Accordingly, when each item of the entry 150 is referred to, it is possible to know where the contents of the corresponding shared virtual page exist and how these contents can be accessed.

The method for managing the shared virtual storage by using the data structure shown in FIGS. 12 and 13 will now be explained with reference to the flowchart in FIG. 14.

The present invention is characterized in that a shared virtual storage mapping table which shows where each page of the shared virtual storage is allocated is disposed in the shared external storage and the contents of the shared virtual storage are made consistent between the processors by using the shared virtual storage mapping table.

For this purpose, when the contents of the shared virtual storage 110 must be removed from the real storage 102 due to the shortage of the real storage, the contents of the real storage 102 are written in the shared external storage 104 and then the entry 150 corresponding to the virtual page of the mapping table 130 in the shared external storage 104 are updated. The flag 151 which shows the position of the contents updates the position from the real storage to the shared external storage, and the address written previously is set to the address 153 in the shared external storage (Step 351).

When a certain processor (the processor A 101a is assumed) tries to refer to the shared virtual storage and the contents did not exist in the real storage 102a of the processor, the entry 150 corresponding to the virtual page which generated the page fault in the mapping table 130 in the shared external storage 104 is read (Step 352). The flag 131 of the read entry 150 is checked to discriminate whether the contents of the virtual storage exist in the real storage of the other processor or not (step 353). If the contents exist in the real storage of the other processor, the processor identifier 132 identifies the processor (the processor B, for example) and a request is made to this processor to write the contents of the corresponding virtual page, and the completion of the writing is awaited (Step 354).

When the contents do not exist in the real storage of the other processor or when the other processor has completed the writing, the contents of the corresponding page are read from the shared external storage 104 and are stored in the real storage 102 of the own processor (Step 355). Then, the entry 160 corresponding to the virtual page of the mapping table 130 is rewritten. The flag 151 indicates that the real storage has been allocated, and the processsor identifier 152 indicates the own processor 101a (Step 356).

In the meantime, the processor B 101b which has been requested to write the contents writes the requested contents of the virtual storage in the shared external storage 104 (Step 357). The written address is written in the shared external storage address 153 of the corresponding entry 150 of the mapping table 130, and the flag 151 is rewritten to indicate the shared external storage (Step 358). Then, the completion of the writing is informed to the processor A 101a (Step 359).

Figure 4:
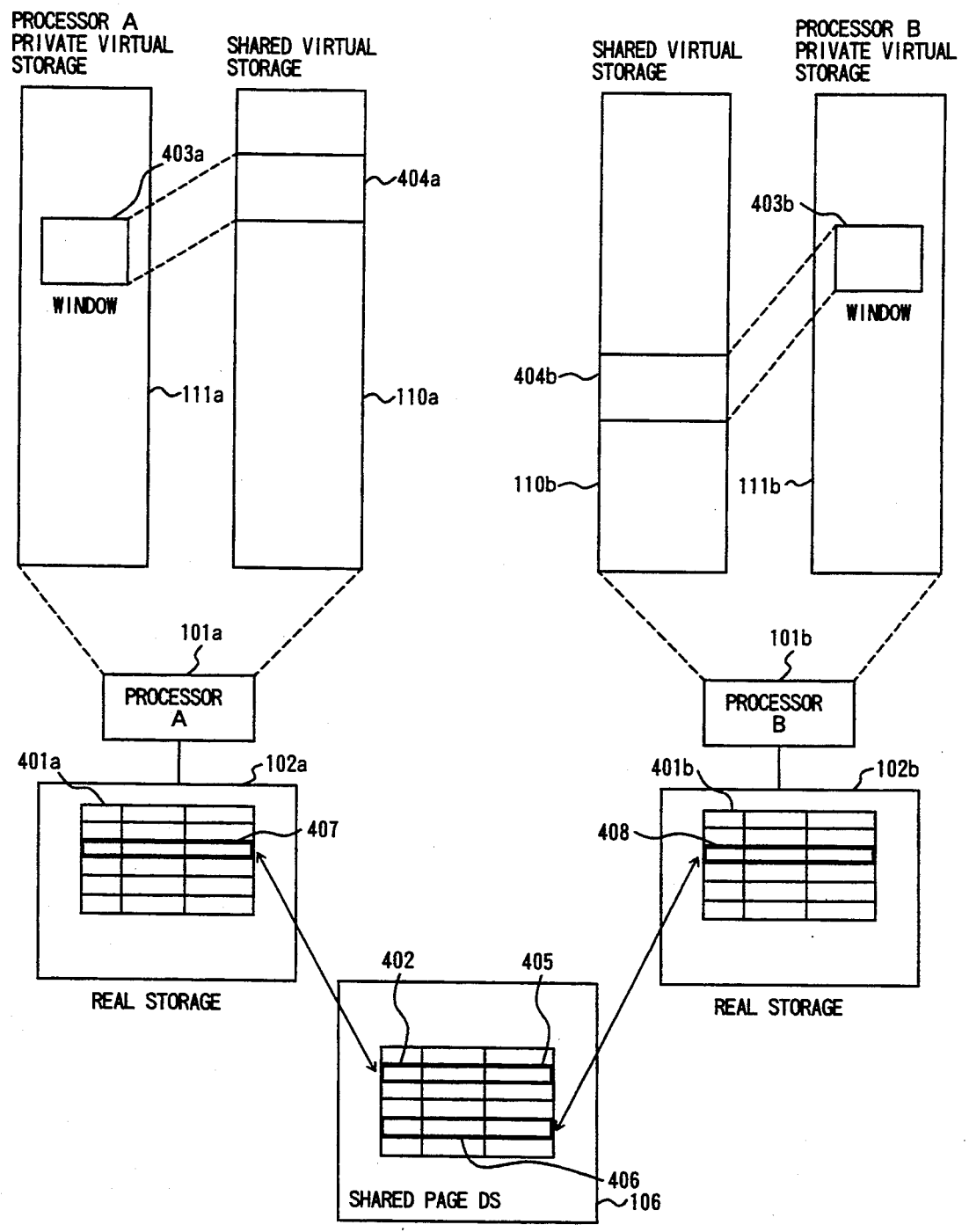
FIG. 4 is a block diagram showing the functional structure of the system in the case of making reference to the shared virtual storage through the window area.

FIG. 4 shows an embodiment of the case in which the shared virtual area is referred to through the window area. The processor A 101a and the processor B 101b have their own virtual storages 111a and 111b respectively. In order to manage these own virtual storages of the processors, address translation tables 401a and 401b for these own virtual storages are held in real storages 102a and 102b. Contents and meaning of each entry therefor are as explained in FIG. 8.

In the meantime, the shared virtual storages 110a and 110b have the same contents and are managed by the shared virtual storage address translation table 402 on the shared PGDS 106, as explained in FIG. 1. However, in the present embodiment, an address translation table is not prepared for each processor but only one common address translation table is prepared. In other words, any one of the contents 204a and 204b of the two address translation tables shown in FIG. 2 is stored in the address translation table 402.

When a certain virtual page 404a of the shared virtual storage 110a is to be referred to through an optional window page 403a of the own virtual storage 111a of the processor A 101a, the entry 405 corresponding to the virtual page 404a to which the address translation table 402 for the shared virtual storage will refer, is copied in the entry 407 of the address translation table 401a corresponding to the window page 403a for the virtual storage of the processor A.

When the window page 403a is referred to after the above operations, the entry 407 which is a copy of the entry 405a appears and this means that the entry 405a corresponding to the virtual page 404a appears, so that it becomes possible to access to the virtual page 404a of the shared virtual storage.

Similarly, in order to refer to the virtual page 404b of the shared virtual storage 110b through the window page 403b in the virtual storage 111b of the processor B, the address translation table entry 406 in the shared PGDS (corresponding to the virtual page 404b) is copied in the entry 408 of the virtual storage address translation table 401a of to the processor B.

In the above case, when the virtual address of the window page 403a is equal to that of the window page 403b, different contents can be referred to if the addresses of the virtual pages 404a and 404b of the shared virtual storages are different.

Next, details of the procedure for referring to the shared virtual storage which constitutes the data structure of FIG. 4 and uses the window will be explained with reference to the flowcharts in FIGS. 5A and 5B.

Figure 5:
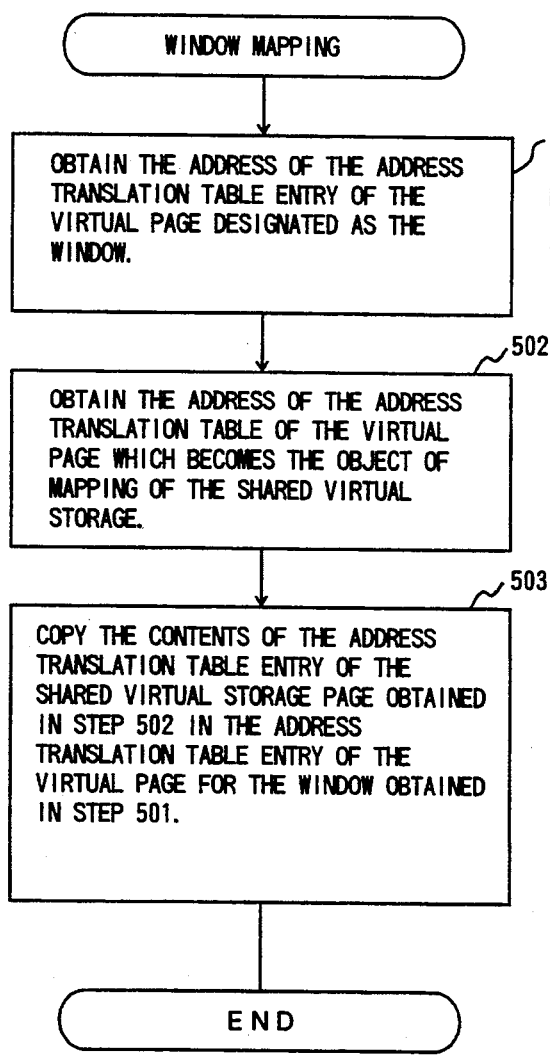
FIGS. 5A and 5B are flowcharts showing the procedure of constituting the functional structure in FIG. 4 and making reference to the shared virtual storage by the window.
Figure 5:
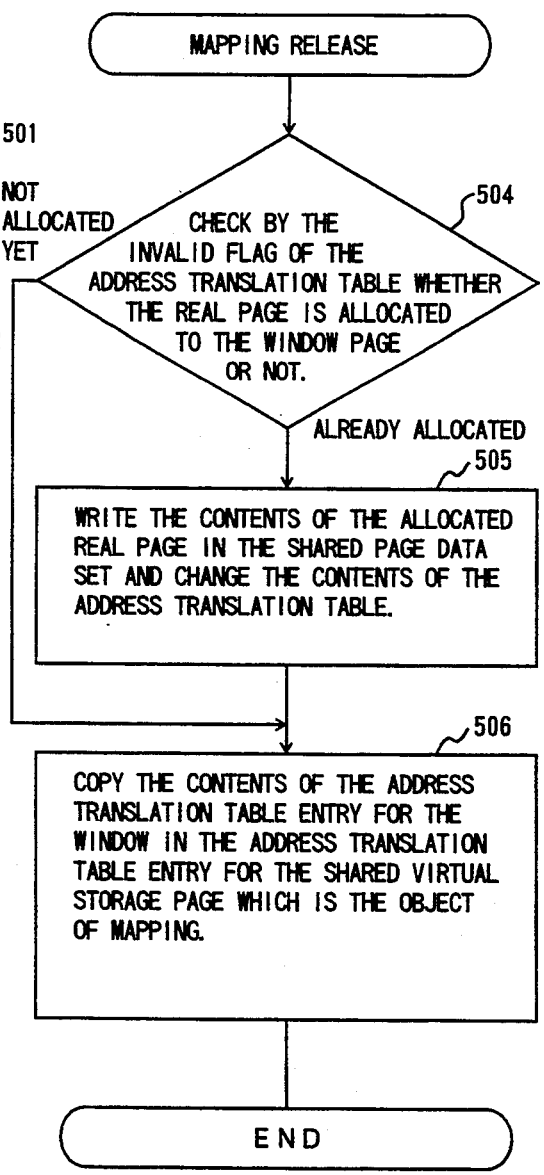

The flowchart for making reference to the virtual page 404a of the shared virtual storage 110a by using, as a window, a certain virtual page 403a of the virtual storage proper to the processor A is shown in FIG. 5A.

In FIG. 5A, first, the entry 407 for address translating the virtual page 403a in the address translation table 401a for address translating the virtual storage proper to the processor A is obtained (Step 501). This can be obtained by using the relative page address of the virtual page and the header address of the address translation table.

Next, the address translation table entry 405 of the virtual page 404a of the shared virtual storage which is to be accessed is obtained (Step 502). The contents of the obtained entry 405 are copied in the entry 407 of the window page (Step 503). By this arrangement, the shared virtual page 404a becomes accessible through the window area 403a.

FIG. 5B shows the method of releasing the window correspondence. In this case, whether a real storage has been allocated to the window or not is first checked (Step 504). This check is carried out by checking the invalid flag of the entry of the address translation table 401 for the window. If the invalid flag is off (that is valid, or, a real page has been allocated), the corresponding page is written (copied) in the shared external page of the shared PGDS 106 and the address translation table entry 407 is rewritten (the invalid flag is changed from on to off) (Step 505). Then, the contents of the address translation table entry 407 for the window are copied in the entry 405 of the address translation table 402 corresponding to the shared virtual page 404a (Step 506).

Figure 6:
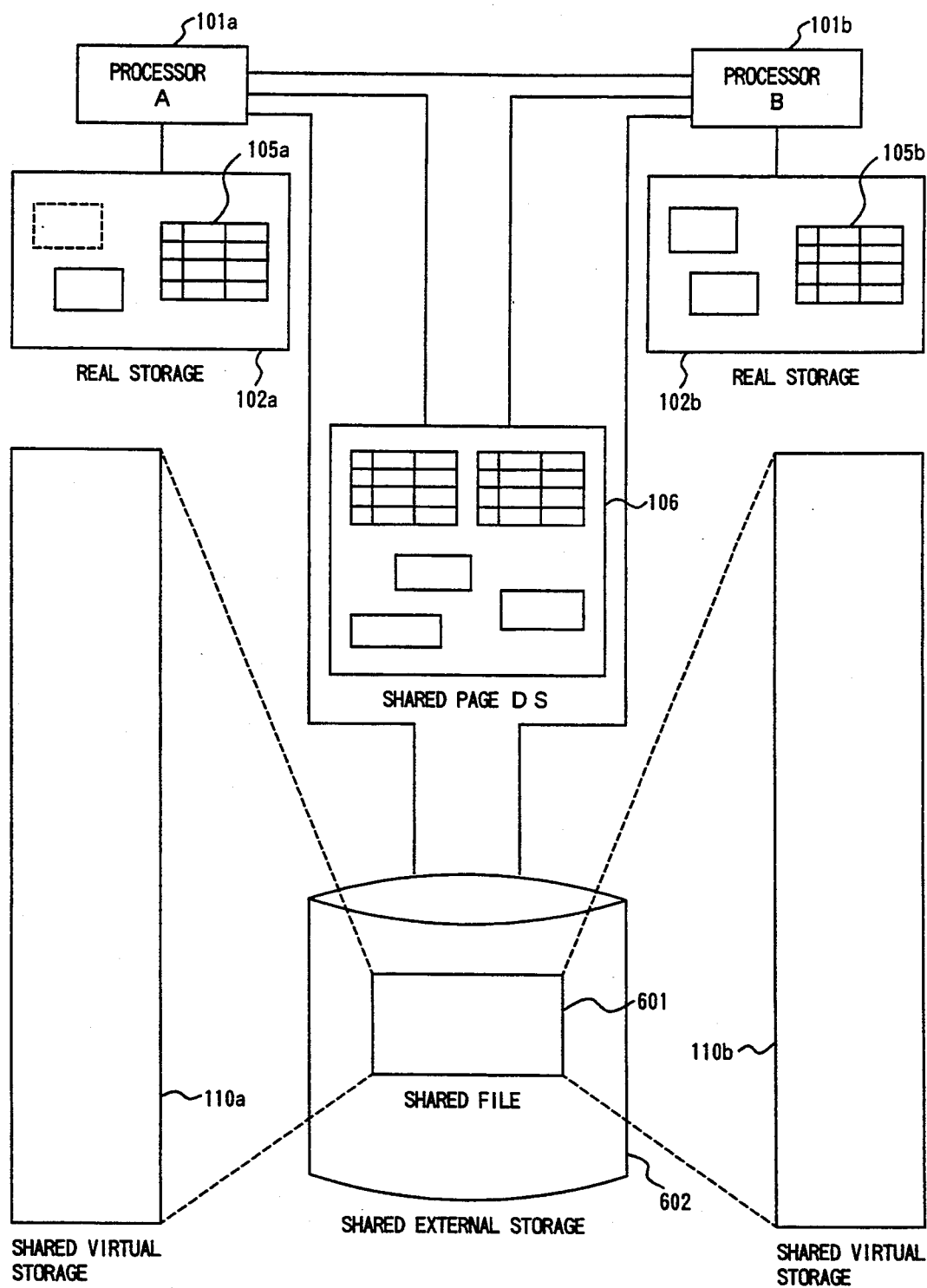
FIG. 6 is an explanatory diagram for explaining the virtualization method by storing the contents of the shared file in the shared virtual storage and deleting the I/O operation for the shared file.

FIG. 6 shows an embodiment that the contents of the shared file are stored in the shared virtual storage and the I/O operation to the shared file is reduced.

A shared file is a data set which exists in the shared external storage 602. In order to increase the speed of accessing the shared file 602, the contents of the file 602 are stored (copied) in the shared virtual storages 110a and 110b. In this case, since the shared virtual storages 110a and 110b hold the same contents, the contents may be stored in only one of the two. As described above, the shared virtual storages are disposed in the real storages 102a and 102b of the processors or in the shared PGDS 106 provided in the shared external storage 104. Accordingly, when there is a request for making access to the shared file 601, the shared virtual storage 110 may be accessed instead of directly accessing the shared file 601, so that an apparent I/O time can be saved.

Figure 7:
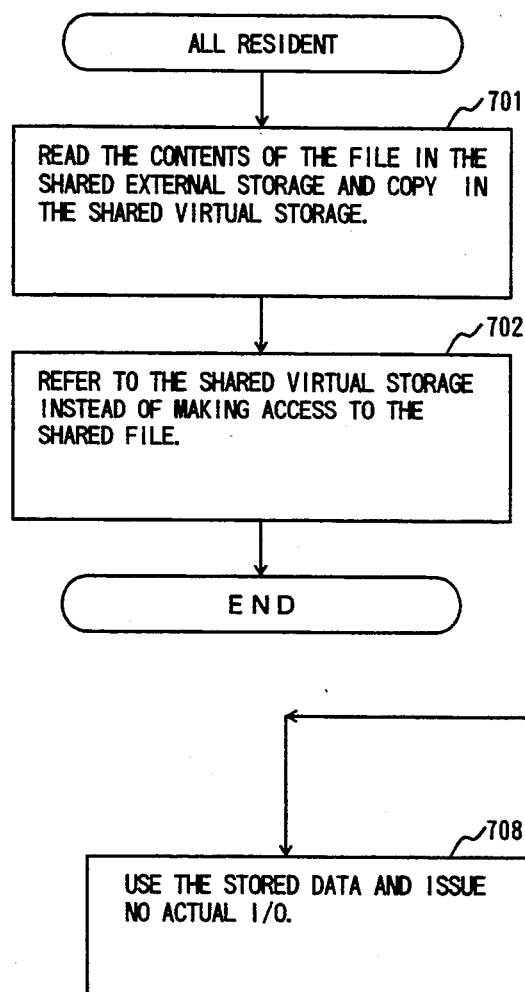
FIGS. 7A and 7B are flowcharts showing the procedure for virtualizing an input to and an output from the shared file among the processors by using the shared virtual storage in FIG. 6.
Figure 7:
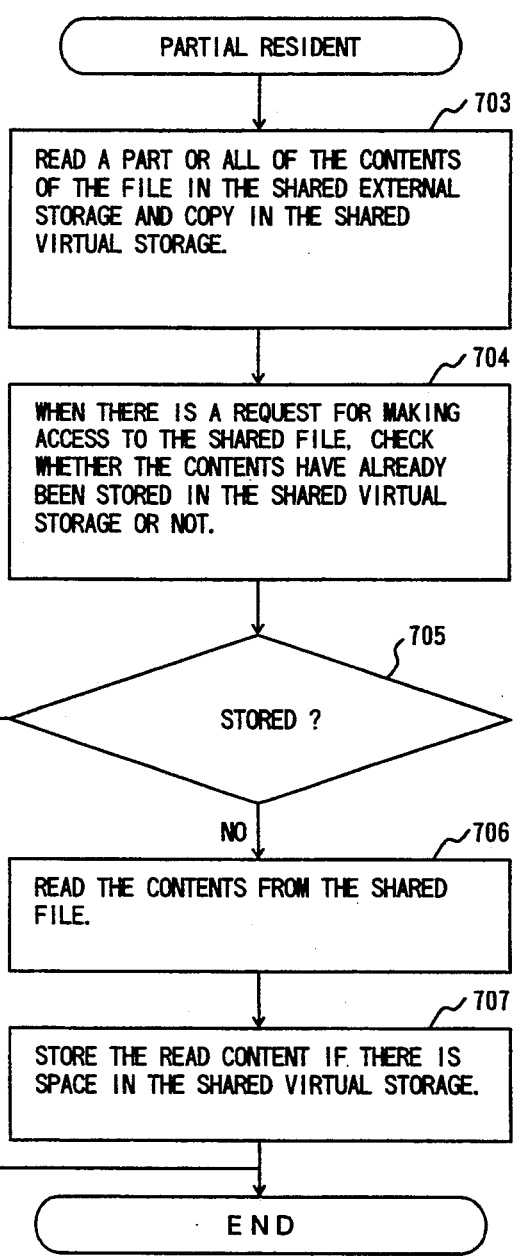

FIGS. 7A and 7B are processing flows for making a high-speed access by storing the contents of the shared file 601 in the shared virtual storage 110.

In FIG. 6A, the contents of the shared file 601 in the shared external storage are read and copied in the shared virtual storage 110 (Step 701). Instead of issuing an I/O instruction to the shared file 601 and reading the contents, a machine instruction is used to directly address the shared virtual storage 110 (Step 702).

FIG. 7B shows the case of a partial resident.

A part or whole of the contents of the shared file 601 in the shared external storage is read and it is copied in the shared virtual storage 110, and the portion of the copy is stored (Step 702). When there is a request for making access to the shared file 601, whether the requested portion is the copied portion in Step 703 or not is retrieved (Step 704). If the requested portion was not copied (Step 705), the requested contents are read from the shared file 601 (Step 706). Then, if there is space in the shared virtual storage 110, the read contents are stored there (Step 707). If the requested contents have already been stored in the shared virtual storage 110 (Step 705), the stored data is used and no I/O processing is carried out.

By the above processings, it is possible to carry out a high-speed I/O operation even if the capacity of the shared file 601 is larger than the capacity of the shared virtual storage 110.

In the above explanation, the case of using an extended storage (ES) for the shared external storage has been assumed. However, as described previously, the types of the shared external storage are not relevant so long as the shared external storage is an external storage shared between the processors. However, the effect of the operation speed is improved if a high-speed storage such as the ES is used.

As described above, according to the present invention, in the LCMP system, when the contents of the virtual storage and the contents of the address translation table are stored in the shared external storage (a shared PGDS), it is possible to realize a shared virtual storage which is a virtual storage that can be shared between the processors, so that there is an effect that data sharing and communication between the processors can be performed easily and at high speed. Further, when an extended storage (ES) is used as a shared page data set, the above effect can be further improved.

Furthermore, when a shared virtual storage is used as a cash memory of the shared file, the virtualization method can also be applied to an input to and an output from the shared file, with an effect that the speed of the I/O operation is increased and the number of overhead can be reduced.

We claim:

1. A virtual storage management method in a loosely coupled multi-processor system in which individual processors are each individually connected to a respective physically addressable physical main storage, and use virtually addressable virtual storages and share a common physically addressable external storage, the method comprising the steps of:

using physical addresses, with a first processor included in said multi-processor system, i) copying first data from a first main storage connected to said first processor into said shared external storage, and ii) storing a mapping table in said shared external storage, said mapping table including storage positional information of said first data stored in said first main storage dispositive of where said first data is stored in said shared external storage;

with a second processor that is one of the processors included in said loosely coupled multi-processor system, i) addressing a virtual storage location in the multi-processor system using a first virtual address ii) detecting that an area corresponding to the virtual storage location addressed by said first virtual address has not been allocated to a second main storage connected to said second processor, and iii) with the second processor and using physical addressing, copying the first data into said second main storage from said shared external storage corresponding to said virtual storage location, wherein the steps of addressing, detecting and copying include steps of referring to said mapping table by the second processor and obtaining the storage positional information of said first data in said shared external storage; and, with said second processor, accessing the first data copied into said second main storage.

2. A virtual storage management method according to claim 1, wherein accesses to said first data are made in page units.

3. A virtual storage management method according to claim 1, further comprising executing, using physical addresses, a data transfer between said shared external storage and respective ones of said main storages connected to ones of said processors, using said shared external storage as an extended storage, in synchronism with an instruction for said data transfer.

4. A virtual storage management method in a loosely coupled multi-processor system in which individual processors are each connected to physically addressable physical main storages and use virtually addressable virtual storages to share a physically addressable external storage between the individual processors in the loosely coupled multi-processor system, the method comprising the steps of:

storing, with each of said individual processors, a mapping table in said shared external storage, the mapping table storing i) a usage state of data in said virtual storage and ii) storage positional information of said data in said shared external storage, to manage each virtual storage;

physical address addressing, with a first processor included in said multi-processor system, first data stored in a first main storage connected to the first processor;

referring to, when said first data is not stored in said first main storage, with a second processor using a physical address, the mapping table for managing the virtual storage of said second processor stored in said shared external storage and determining the usage state of said first data by the second processor;

when, as a result of determining from the usage state that the second processor is using the first data to be accessed, requesting, from the first processor to the second processor that the first data to be accessed be copied in said shared external storage;

with the second processor using physical addressing, storing the first data in said shared external storage in response to the request, and copying using physical addressing, with the first processor, the first data to be accessed, into the main storage connected to the first processor; and, accessing using physical addressing, with the first processor, the first data read into said main storage.

5. A virtual storage management method according to claim 4, further comprising, with said first processor, obtaining the storage positional information of the first data to be accessed, stored in said shared external storage, from the mapping table.

6. A virtual storage management method according to claim 4, wherein said first data accesses are made in page units.

7. A virtual storage management method according to claim 4, further comprising: executing, using physical addresses, a data transfer between said shared external storage and respective ones of said main storages connected respectively to ones of said processors, using said shared external storage as an extended storage, in synchronism with an instruction for said data transfer.

8. A virtual storage management method for use in a loosely coupled multi-processor system in which individual processors are each connected to respective physically addressable physical main storages, use virtually addressable virtual storages and share a common physically addressable external storage, the method comprising the steps of:

allocating, in said shared external storage, a page data set to be shared by each processor;

storing data in at least a part of said shared page data set;

when a first processor included in said loosely coupled multi-processor system addresses the virtual storage of the first processor using a virtual address and generates a page fault, using physical addressing, copying data to be accessed and stored in said shared page data set into the main storage connected to the processor; and, accessing, with the first processor using a physical address, the data read said main storage.

9. A virtual storage management method according to claim 8, further comprising storing, in said shared external storage, an address translation table storing correspondence information between the virtual storage address corresponding to the shared page data set and the storage position in said shared external storage, for each processor to manage its respective virtual storage; and, when said page fault occurs, referencing said address translation table and obtaining the storage position of the data to be accessed in the shared external storage.

10. A virtual storage management method according to claim 9, wherein: said address translation table further includes the usage state of said data by each of said processors, the address translation table being stored in the shared page data set; and, when said page fault occurs, referencing said usage state stored in said address translation table, and determining a method of allocating the virtual storage which includes the data to be accessed in said main storage.

11. A virtual storage management method according to claim 10, further comprising providing said address translation table in said shared page data set which is allocated to said shared external storage.

12. A virtual storage management method according to claim 8, wherein:

when the data to be accessed is to be read into the main storage connected to said processor, discriminating whether the data to be accessed has been stored in said shared page data set; and, as a result of said discrimination, if the data to be accessed has been stored in said shared page data set, copying the data to be accessed into the main storage connected to said processor.

13. A virtual storage management method according to claim 8, further comprising executing a data transfer, using physical addressing, between said shared external storage and main storages connected respectively to said processors, using said shared external storage as an extended storage, in synchronism with an instruction for said data transfer.

14. A virtual storage management method in a loosely coupled multi-processor system in which individual processors are connected to respective physically addressable physical main storages, use virtually addressable virtual storages and share a common physically addressable external storage, the method comprising the steps of:

(a) a first step of allocating, to said shared external storage, a page data set shared by individual processors;

(b) a second step of providing, in said shared page data set, the address translation tables owned by the individual processors relating to the shared virtual storage corresponding to said shared page data set; and, (c) when a first processor included in said multi-processor processor system virtually addresses said shared virtual storage and generates a page fault, said first processor performs the steps of:

(c-1) referencing the address translation table owned by a second processor provided in said shared page data set, and checking whether said second processor has already allocated the area of said shared virtual storage in which said page fault was generated in the main storage connected to said second processor;

(c-2) when said second processor has already allocated the area of said shared virtual storage in said main storage connected to said second processor, issuing a request to said second processor to copy the contents of the main storage connected to said second processor to which the area of said shared virtual storage has been allocated, into said shared page data set;

(c-3) copying into the main storage connected to said processor, the contents of the area of said shared virtual storage stored in said shared page data set by said second processor in response to said requests; and, (c-4) accessing, using physical addressing, the contents of the area of said shared virtual storage read into the main storage connected to said processor.

15. A virtual storage management method according to claim 14, further comprising accessing the data stored in said shared page data using a machine instruction for accessing said shared virtual storage.

16. A virtual storage management method according to claim 14, further comprising executing, using physical addresses, a data transfer, using said shared external storage as an extended storage, between said shared external storage and respective ones of said main storages connected respectively to ones of said first and second processors, in synchronism with an instruction for said data transfer.

17. A virtual storage management method in a loosely coupled multi-processor system in which individual processors are each individually connected to respective physically addressable physical main storages, use virtually addressable virtual storages and share a common physically addressable external storage, the method comprising the steps of:

allocating, to said shared external storage, a page data set to be shared by individual processors;

providing, in said shared page data set, address translation tables owned by said individual processors relating to the shared virtual storage corresponding to said shared page data set;

using, as a first window area, a part of the virtual storage assigned to a first processor included in said multi-processor system, and forming a first instruction mapping the first window area in any one part of said shared virtual storage;

based on the first mapping instruction, copying an entry corresponding to said first window area within an address translation table relating to said shared virtual storage, in a predetermined entry within an address translation table relating to said first window area in said virtual storage assigned to said first processor;

accessing, with the first processor, any one part of the area of said shared virtual storage by using the copied contents of the predetermined entry within the address translation table relating to said first window area;

instructing, with said first processor, an end to said mapping upon completion of the access to said shared virtual storage corresponding to said entry; and, copying, with said first processor, based on the instruction of the completion of said mapping, the predetermined entry within the address translation table relating to said first window area into the entry corresponding to said first window area within the address translation table relating to said shared virtual storage.

18. A virtual storage management method according to claim 17, further comprising:

when the entry corresponding to said first window area within the address translation table relating to said shared virtual storage is to be copied in a predetermined entry within the address translation table relating to said shared virtual storage, setting a flag indicating that the area shown by the entry corresponding to the entry of said first window area within the address translation table relating to said shared virtual storage is being mapped; and, resetting said flag when the predetermined entry within the address translation table relating to said first window area is to be copied in the entry corresponding to said first window area within the address translation table relating to said shared virtual storage.

19. A virtual storage management method according to claim 18, further comprising stalling a processing based on a new mapping instruction when said flag is being set.

20. A virtual storage management method according to claim 17, further comprising executing, using physical addresses, a data transfer between said shared external storage and respective ones of said main storages connected respectively to ones of said processors, using said shared external storage as an extended storage, in synchronism with an instruction for said data transfer.

* * * * *

UNITED STATES PATENT AND TRADEMARK OFFICE
CERTIFICATE OF CORRECTION

PATENT NO. : 5,404,478
DATED : April 4, 1995
INVENTOR(S) : Toshiaki Arai, et al.

It is certified that error appears in the above-indentified patent and that said Letters Patent is hereby corrected as shown below:

Claim 3, column 16, line 33, after "comprising" insert --:--.

Claim 9, column 17, line 45, after "comprising" insert --:--.

Claim 14, column 18, line 36, delete the second occurrence of "processor".

Claim 16, column 18, line 68, after "comprising" insert --:--.

Claim 20, column 20, line 32, after "comprising" insert --:--.

Signed and Sealed this

Thirtieth Day of May, 1995

*Attest:*

BRUCE LEHMAN

*Attesting Officer*     *Commissioner of Patents and Trademarks*